(12) United States Patent
Ghezzi et al.

(10) Patent No.: US 9,815,631 B2
(45) Date of Patent: Nov. 14, 2017

(54) CURVILINEAR SUPPORT FOR CHAIN CONVEYORS

(71) Applicant: SYSTEM PLAST S.RL., Telgate (BG) (IT)

(72) Inventors: Gabriele Ghezzi, Sesto San Giovanni (IT); Gregorio Lordi, Trescore Balneario (IT); Leendert Van Vliet, Corte Franca (IT)

(73) Assignee: SYSTEM PLAST S.RL., Telgate (BG) (IT)

( * ) Notice: Subject to any disclaimer, the term of this patent is extended or adjusted under 35 U.S.C. 154(b) by 0 days.

(21) Appl. No.: 15/230,178

(22) Filed: Aug. 5, 2016

(65) Prior Publication Data

US 2017/0036861 A1    Feb. 9, 2017

(30) Foreign Application Priority Data

Aug. 6, 2015    (IT) .................. 102015000043007

(51) Int. Cl.
  *B65G 21/16*    (2006.01)
  *B65G 21/22*    (2006.01)
  *B65G 17/06*    (2006.01)
  *B65G 21/06*    (2006.01)
(52) U.S. Cl.
  CPC ........... *B65G 21/22* (2013.01); *B65G 17/066* (2013.01); *B65G 21/16* (2013.01); *B65G 21/06* (2013.01); *B65G 2207/48* (2013.01)
(58) Field of Classification Search
  CPC .............................. B65G 21/22; B65G 21/16
  See application file for complete search history.

(56) References Cited

U.S. PATENT DOCUMENTS 4,961,492 A    10/1990    Wiseman et al.
5,042,648 A  *  8/1991    Garvey ............... B65G 17/066
                                                        198/321

(Continued)

FOREIGN PATENT DOCUMENTS

CA    1217162 A    1/1987
CA    2068511 A1    11/1993

(Continued)

*Primary Examiner* — Thomas Randazzo
(74) *Attorney, Agent, or Firm* — King & Schickli, PLLC

(57) ABSTRACT

A curvilinear support for chain conveyors comprising: a base (2) with elongated shape extending along a curved path; at least two rails (3) produced in one piece with the base (2) and spaced from each other to define between them a channel (4) for the sliding of a chain conveyor; covering profiles (5, 8) respectively coupled to each rail (3) to cover the base surface (3b) and the concave lateral surface (3a) of said at least two rails (3); coupling members (6) positioned between each profile (5, 8) and the respective rail (3) to removably fix each profile (5, 8) to the respective rail (3); said coupling members (6) being accessible via a coupling surface (3a; 3b) of the rails (3) with the respective profiles (5, 8); said coupling members (6) comprise a male portion (6a) projecting from each profile (5, 8) and extending below each profile (5, 8), and a female portion (6b) obtained in the respective rail (3) open towards the top to house the corresponding male portion (6a), which for coupling said male portion (6a) is pushed from the top down into said female portion (6b).

5 Claims, 2 Drawing Sheets

(56) References Cited

U.S. PATENT DOCUMENTS

| | | | | |
|---|---|---|---|---|
| 5,857,560 A | * | 1/1999 | Bjorkholm | B29C 45/14565 198/816 |
| 6,601,696 B1 | * | 8/2003 | van Zijderveld | B65G 21/2009 198/805 |
| 6,964,333 B2 | * | 11/2005 | Ledingham | B65G 21/06 198/836.3 |
| 2002/0014394 A1 | * | 2/2002 | Mann | B65G 15/62 198/837 |
| 2005/0023112 A1 | * | 2/2005 | Karnes | B65G 19/282 198/838 |
| 2006/0151300 A1 | * | 7/2006 | Blasi | B65G 17/066 198/793 |
| 2012/0152700 A1 | * | 6/2012 | Andreoli | B65G 21/16 198/836.1 |

FOREIGN PATENT DOCUMENTS

| | | |
|---|---|---|
| EP | 1148003 A1 | 10/2001 |
| EP | 2907774 A1 | 8/2015 |
| WO | 2010146098 A1 | 12/2010 |
| WO | WO2010146098 A1 | 12/2010 |

\* cited by examiner

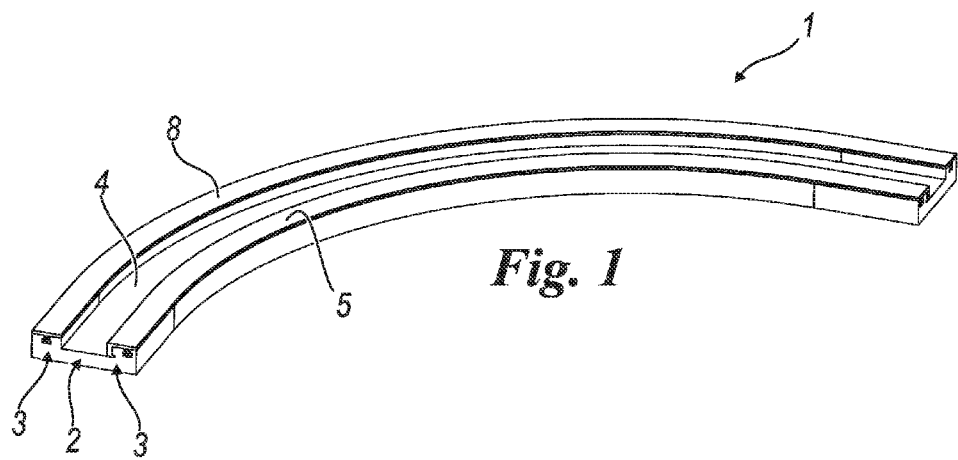
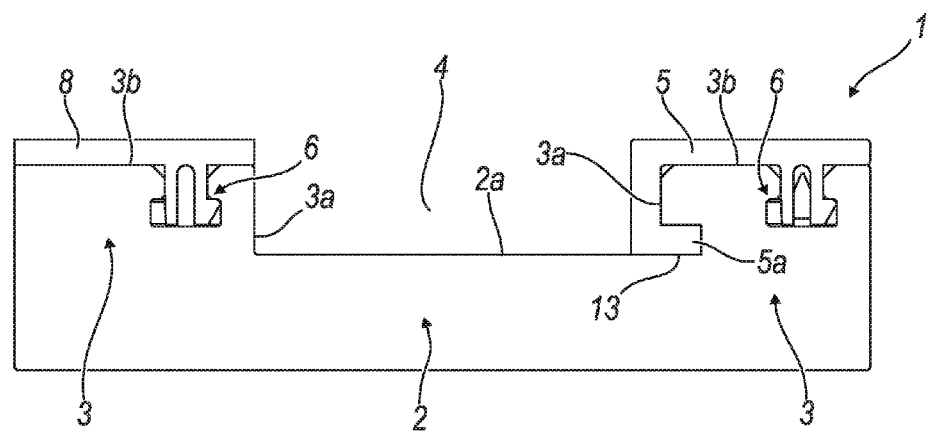

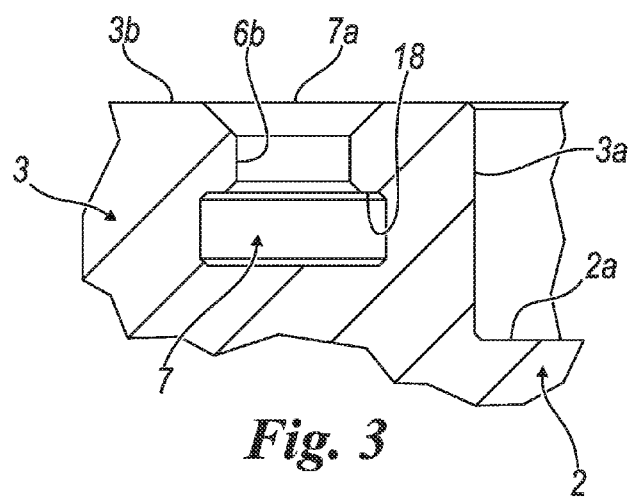
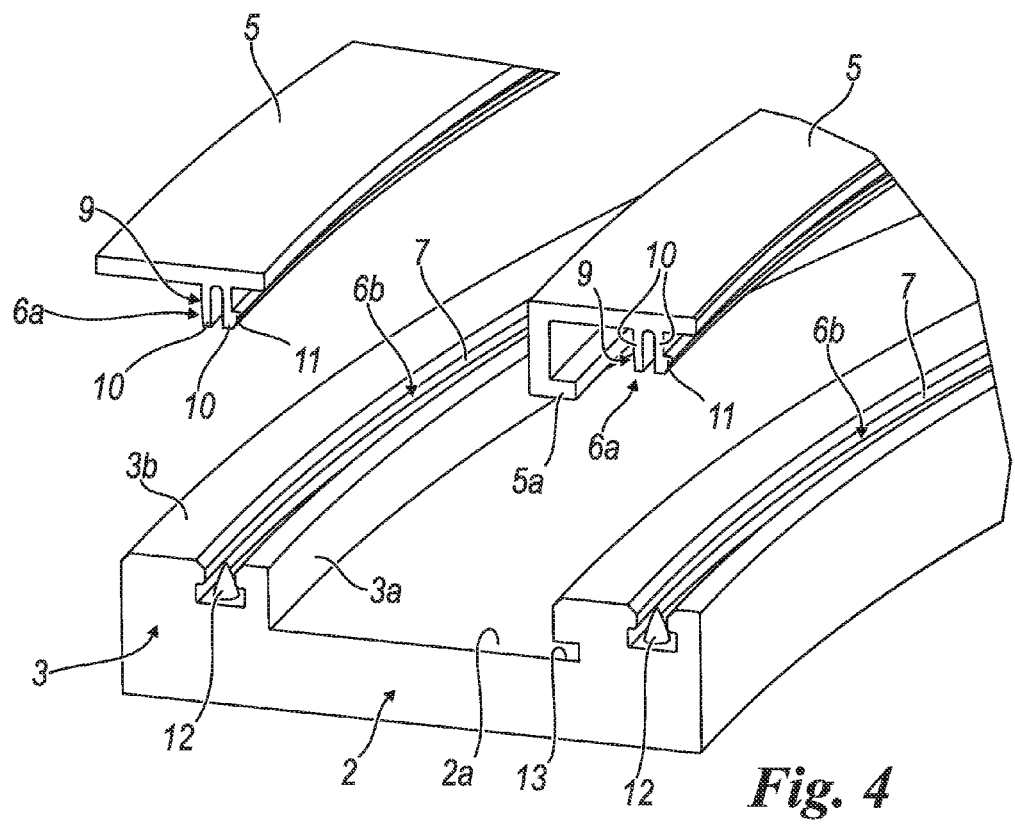

CURVILINEAR SUPPORT FOR CHAIN CONVEYORS

FIELD OF THE INVENTION

The present invention concerns a curvilinear support for chain conveyors and a method for covering a base of a curvilinear support for chain conveyors with a replaceable profile.

BACKGROUND OF THE INVENTION

The present invention can be applied in the set-up of chain conveyor lines which, in addition to rectilinear sections, also have curvilinear sections.

The curvilinear supports for chain conveyors comprise an element elongated along a curvilinear path which includes a central channel in which a plurality of conveyor chain joining portions lie and also includes lateral rails on which a plurality of supporting portions lie, belonging to the respective joining portions of said chain.

The supports are made of materials which have good mechanical characteristics as they must withstand the chain and the stress produced by the movement thereof.

The action of the chain on the curvilinear support determines a friction which, after a certain period of time, makes said support unserviceable.

To remedy this phenomenon, curvilinear supports are known in which the rails, i.e. the part of the support subjected to the greatest stress, are made of a material with clearly improved tribologic characteristics, compared to the material with which the base is produced.

Even if they have improved resistance to wear, the rails have to be periodically replaced.

As known, the rails are fixed to the base of the support by means of screws, joints or other.

In particular, a curvilinear support for chain conveyors is known in which the rails are slid non-removably into the base along the extension path of said support as shown, for example, in the document WO2010/146098.

In this case, when the worn rails have to be replaced, the entire curvilinear support must be removed from the conveying line and replaced.

SUMMARY OF THE INVENTION

In this context, the technical task underlying the present invention is to propose a curvilinear support for chain conveyors which overcomes the drawbacks of the known art cited above.

In particular, the object of the present invention is to make available a curvilinear support for chain conveyors which allows a quick convenient maintenance and does not entail long standstills of the conveying line.

The technical task and the object specified are substantially achieved by a curvilinear support for chain conveyors comprising the technical characteristics described in one or more of the attached claims.

BRIEF DESCRIPTIONOF THE DRAWING FIGURES

Further characteristics and advantages of the present invention will appear clearer from the indicative and therefore non-limiting description of a preferred but not exclusive embodiment of a curvilinear support for chain conveyors, as illustrated in the accompanying drawings in which:

FIG. 1 is a perspective view of a curvilinear support for chain conveyors according to the present invention;

FIG. 2 is a section view of the curvilinear support from FIG. 1;

FIG. 3 is a section view of a detail of the curvilinear support from FIG. 1;

FIG. 4 is an exploded view of a detail of the curvilinear support from FIG. 1.

DETAILED DESCRIPTION OF THE INVENTION

With reference to the attached figures, the number 1 indicates overall a curvilinear support for chain conveyors according to the present invention.

The support 1 comprises a base 2 and at least two rails 3 positioned laterally with respect to the base 2.

The base 2 is a flat element with an elongated shape which extends along a curved path.

The curvature of the path is arbitrary. It can be circular, parabolic or other.

The rails 3 are made in one piece with the base 2 and extend away from it. The rails 3 are elongated elements which extend along a curved path according to that of the base 2.

The rails 3 are reciprocally spaced so that the distance between them remains constant throughout their extension.

The base 2 and the two rails 3 define a track for the sliding movement of a chain conveyor (not illustrated).

In one embodiment of the present invention not illustrated, the support 1 comprises a base 2 and several rails. In this way, two different and distinct tracks for the sliding movement of two different chain conveyors are defined.

It should be observed that, in this example, there are two lateral rails 3 and one central rail which serves both tracks.

Going back to the embodiment described (in which only one track is defined), the two rails 3 define between them a channel 4 inside which the chain runs and is at least partly housed.

In detail, the channel 4 is defined by a base surface 2a and by the two lateral surfaces 3a facing each other and belonging to the rails 3.

The rails 3 also have respective flat base surfaces 3b. The base surfaces 3b of the rails 3 are connected to the lateral surfaces 3a.

In use, when the chain conveyor is mounted on the support 1, the joint portion of the conveyor (that is the chain link) lies in the channel 4, while the supporting portions of the conveyor (i.e. the portions fixed to the joining portions on which the conveyed products lie) rest on the base surfaces 3b of the rails 3.

According to the present invention, the support is not a direct support but an indirect support.

In this regard, the support 1 comprises covering profiles 5 and 8 positioned on the rails 3. In this way, the rails 3 are protected from contact with the chain. Therefore the chain and the rails 3 are in contact via the profiles 5 and 8.

The profile 5 has an "L" shaped cross section rotated by 90° in the clockwise direction with an appendage on the short side of the "L" which runs parallel to and below the arm along the "L".

The profile 8 has an "I" shaped cross section rotated by 90°.

This allows the profile 5, when applied, to always cover the base surfaces 3b of the rails 3 and at least one of the lateral surfaces 3a of the rails 3; and allows the profile 8 to cover the base surface 3b.

The profile 5 covers the base surface 3*b* and the concave lateral surface 3*a* of one of the rails 3. The other profile 8 covers only the base surface 3*b*. Obviously, the lateral surface 3*a* of this rail is not covered.

In fact, when the chain is moving, it stresses mainly the convex lateral surface 3*a* of the rail 3 (in addition to the base surfaces 3*b*) and not the concave lateral surface 3*a*.

Coupling members 6 are provided between each profile 5 and 8 and the respective rail 3 to allow correct stable coupling thereof.

In particular, according to the present invention, the coupling members 6 are, at least at the ends of the curve, accessible through a coupling surface of the rails 3 with the profiles 5 and 8.

In other words, the coupling members 6 are accessible through the surfaces of each rail which are directly coupled to the profiles 5 and 8.

As seen, said coupling surfaces can be the lateral surfaces 3*a* and/or the base surfaces 3*b* of the rails 3.

In the embodiment illustrated and preferred, the coupling members 6 are accessible through the base surfaces 3*b* of the rails 3.

This will be clarified further on in the present discussion.

The coupling members 6 comprise a male portion 6*a* and a female portion 6*b* which can be coupled to one another, arranged along the curvilinear support 1.

In detail, the male portion 6*a* projects, and extends below each profile 5 and 8 and the female portion 6*b* is obtained in the respective rail 3.

Each female portion 6*b* is defined by a respective groove 7 obtained on each rail 3.

In particular, the groove 7 is obtained on the base surface 3*b* of each rail 3, and opens upwards.

The groove 7 extends along each rail 3.

At the base surface 3*b* of the rail 3 an inlet section 7*a* of the groove 7 is defined through which the male portion 6*a* of the coupling members 6 passes.

The groove 7 in section has a narrowed portion in the vicinity of the base surface 3*b* of the rails 3 so as to define an abutment shoulder 18, the function of which will be clarified below.

Furthermore, at each base surface 3*b* of the rails 3, the groove 7 has in section a lead flare, the function of which will be clarified below.

The male portions 6*a* instead comprise respective linear projections 9 obtained in one piece with the profiles 5 and 8 and which extend along the entire length of the profiles 5 and 8.

The projections 9 can be inserted in the corresponding grooves 7 through the inlet sections 7*a* by pushing them down from the top.

Each projection 9 comprises two edges 10 positioned alongside and parallel to each other. They are elastically flexible so as to be mobile in reciprocal movement towards and/or away from each other.

This allows an effective coupling. In fact, when the profiles 5 and 8 are coupled on the respective rail 3, the two edges 10 are pushed into the groove 7 through the inlet section 7*a*. The flare present at the inlet section constrains the edges 10 to move closer together.

When the insertion has been completed, the two edges 10, due to the elastic effect, tend to return to their original position, pressing against the groove 7. The action of the edges 10 in the groove 7 allows optimal anchoring of the profiles 5 and 8 on the rails 3.

To further improve the effectiveness of the coupling, at least one of the edges 10 comprises a tooth 11 which extends transversally to the edge 10 and abuts on the shoulder 18 previously defined.

Preferably, the tooth 11 is obtained on only one of the edges 10.

The coupling members 6 further comprise at least one pin 12 arranged in each groove 7 and housed between the edges 10 when they are in the groove 7.

The pin 12 allows the edges to maintain over time a constant thrust action against the groove 7 to facilitate the coupling.

Advantageously, the coupling members 6 comprise a plurality of pins 12 positioned in the grooves 7.

The pins 12 have a conical shape.

It should also be noted that a recess 13 is provided on the convex lateral surface 3*a* which goes into the rail 3.

As said above, said convex lateral surface 3*a* is covered by the profile 5. The profile 5 has one end 5*a* which is housed by interference fit in the recess 13.

In regard to the materials, it should be noted that the base 2 and the rails 3 can be made with a different material from the material used for the profiles 5. In fact, the characteristics required for each of them are very different.

In detail, the base 2 and the rails 3 must have good mechanical characteristics as they are responsible for the structural function.

Purely by way of example, the component material of the base 2 and the rails 3 can be polyethylene.

The component material of the profiles 5 can have a coefficient friction lower than that of the component material of the base 2 and the rails 3.

Purely by way of example, the component material of the profiles 5 can be polyethylene with the addition of lubricating elements.

Constructively, the profiles 5 are produced by extrusion. It should be noted that the profiles 5 are rectilinear extruded elements. The flexibility of the material used therefore allows the profiles 5 to be curved directly during coupling with the respective rails.

The invention thus described achieves the predefined object.

In fact, when the curvilinear support shows signs of wear which limit its functionality, the only intervention required is replacement of the covering profiles which are, in effect, the only worn part of the curvilinear support.

The worn profiles are replaced by simply pulling them upwards in order to remove them, once the conveyor chain has been removed. The flexibility of the edges of the coupling members permits convenient removal, because it allows sliding out of the profiles away from the base surface of the rails. Said surface is always accessible without any need to remove the curvilinear support from the rest of the conveyor line, once the chain has been removed.

The new profiles can be applied on the rails by simply positioning them over the base surface of the rails and pushing them down against the rails to achieve the coupling described above. Also in this case, the operation can be performed without having to remove the support from the conveying line.

Maintenance of the chain conveyor lines which comprise the curvilinear support according to the present invention, is therefore much quicker and easier, with greatly reduced down times.

The invention claimed is:

1. A curvilinear support for chain conveyors comprising:
   a base (2) with elongated shape extending along a curved path;
   at least two rails (3) produced in one piece with the base (2) and spaced from one another to define between them a channel (4) for the sliding of a chain conveyor;
   covering profiles (5, 8) respectively coupled to each rail (3) to cover the base surface (3b) and a concave lateral surface (3a) of at least said two rails (3);
   coupling members (6) positioned between each profile (5, 8) and the respective rail (3) to removably fix each profile (5, 8) to the respective rail (3);
   said coupling members (6) being accessible via a coupling surface (3a; 3b) of the rails (3) with the respective profiles (5, 8);
      said coupling members (6) comprise a male portion (6a) projecting from each profile (5, 8) and extending below each profile (5, 8), and a female portion (6b) obtained in the respective rail (3) open towards the top to house the corresponding male portion (6a), which for coupling said male portion (6a) is pushed from the top down into said female portion (6b);
      wherein the female portion (6b) comprises a groove (7) obtained on the base surface (2) of each rail (3) and which extends along an extension path of the base (2);
      wherein each male portion (6a) comprises a linear projection (9) extending from the respective profile (5, 8) and which is inserted in the corresponding groove (7) through an inlet section (7a) obtained on the base surface (2) of the rails (3);
      wherein each linear projection (9) comprises edges (10) positioned side by side and flexible in reciprocal movement towards or away from each other;
      wherein at least one of said edges (10) comprises a tooth (11) designed to abut on a shoulder (18) obtained in each groove (7); and
      wherein the coupling members (6) comprise at least one pin (12) arranged in each groove (7) and housed between the edges (10) of the linear projection (9) to fix each projection (9) in the respective groove (7).

2. The support according to claim 1, characterized in that the profiles (5, 8) cover at least the base surfaces (3b) of the rails (3) and at least a lateral surface (3a) of the rails (3).

3. The support according to claim 1, characterized in that the coupling members (6) comprise a plurality of pins (12) arranged in each groove (7) and arranged along a curvilinear segment.

4. The support according to claim 1, characterized in that the profiles (5, 8) are made of a material with a lower coefficient of friction from that of a component material of the base (2) and the rails (3).

5. A method for covering a base of a curvilinear support for chain conveyors with a replaceable profile according to claim 1 characterized in that to replace said profile, the profile is pulled upwards; to insert a new profile, the new profile is positioned over the base surface and pushed down.

* * * * *